Dec. 11, 1934.  C. W. SINCLAIR  1,984,091
METHOD OF FORMING HUB SHELLS OF VEHICLE WHEELS
Filed Aug. 18, 1930
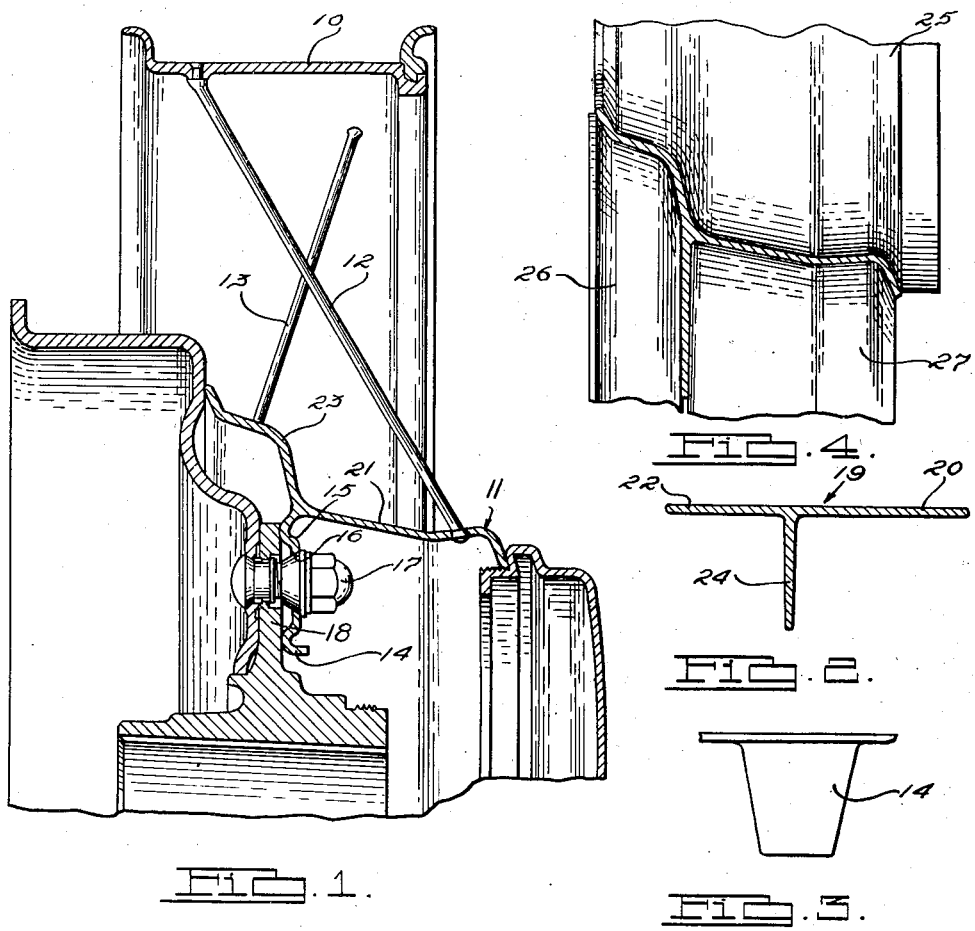
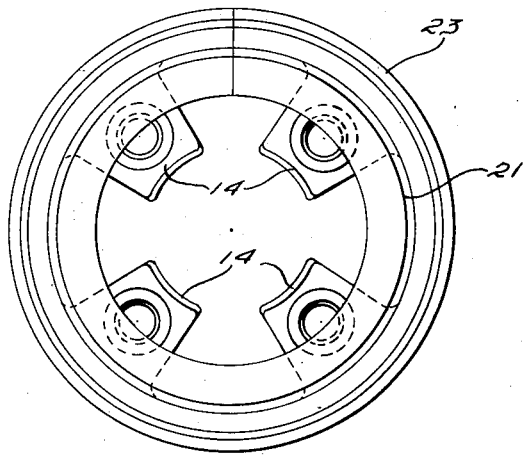
INVENTOR
Charles W. Sinclair.
BY
ATTORNEY Patented Dec. 11, 1934

1,984,091

UNITED STATES PATENT OFFICE 1,984,091

METHOD OF FORMING HUB SHELLS OF VEHICLE WHEELS

Charles W. Sinclair, Detroit, Mich., assignor to Kelsey-Hayes Wheel Corporation, Detroit, Mich., a corporation of New York Application August 18, 1930, Serial No. 476,196

1 Claim. (Cl. 29—159.3)

This invention relates generally to vehicle wheels and has particular reference to an improved method of manufacturing hub shells for vehicle wire wheels.

One of the principal objects of this invention is to provide an improved method of forming hub shells of the type having concealed portions for attaching the same to a vehicle, which consists generally in fashioning the shell from a single piece of sheet metal thereby materially reducing the number of parts and appreciably reducing the weight and cost of manufacture thereof.

With the foregoing as well as other objects in view, the invention resides in the novel construction of the hub shell and the manner in which the same is formed which will be made more apparent as this description proceeds, especially when considered in connection with the accompanying drawing, wherein:

Figure 1 is a sectional view through a vehicle wire wheel equipped with a hub shell constructed in accordance with this invention.

Figure 2 is a cross-sectional view through a strip of stock employed for fashioning the hub shell.

Figure 3 is a fragmentary side elevational view showing one step in the method of manufacturing a hub shell.

Figure 4 is a cross-sectional view showing another step in the method of manufacturing a hub shell, and Figure 5 is a front elevational view of the construction shown in Figure 4 illustrating the manner in which the ends of the blank are secured together to form the completed hub shell.

As will be observed from the drawing, the present invention is illustrated in connection with a vehicle wire wheel comprising a tire carrying rim 10 and a hub shell 11 arranged within the rim 10 and maintained in concentric relation with the latter by means of the front and rear spokes 12 and 13, respectively. The inner ends of the front and rear spokes are secured respectively to the front and rear end portions of the hub shell 11 and the outer ends thereof are secured in any suitable manner to the base of the rim 10. The hub shell 11 is preferably of one piece construction, as will be presently set forth, and is provided with a plurality of lugs 14 having countersunk portions 15 provided with apertures 16 for receiving suitable fastener elements 17 which serve to secure the hub shell to the fixed flange 18 of the inner hub member. The lugs 14 project inwardly from the inner surface of the shell 11 intermediate the front and rear ends thereof and are thoroughly concealed from view.

As previously set forth, the present invention concerns itself more particularly with the method employed for forming the hub shell 11 and as shown in Figure 2, a strip of stock 19 is provided which is preferably a mill section rolled to the contour illustrated in the above figure. The stock 19 is substantially T-shaped in cross section having one of the transverse arms 20 of sufficient width to form the front or barrel section 21 of the shell and having the other arm 22 of sufficient dimension to form the rear outwardly extending portion 23 of the shell. The stem 24 of the T-shaped section is preferably substantially the same thickness as the arms 20 and 22 and is of sufficient width to form the lugs 14 of the shell intermediate the sections 21 and 23 thereof.

In detail, the stem 24 of the stock which is in the form of a flange is blanked out by a suitable stamping operation to form the lugs 14 as shown in Figure 3. After the lugs 14 have been formed, as specified above, the section 19 is introduced to a suitable rolling machine having an outer roll 25 and a pair of inner rolls 26 and 27 arranged upon opposite sides of the lugs 14. The peripheral portions of the forming rolls are shaped to conform to the contour of the shell and engage the inner and outer surfaces thereof as clearly shown in Figure 4 of the drawing. The forming rolls, in addition to fashioning the stock to a predetermined cross-sectional contour, also serve to hoop the stock to form an annulus. The stock may then be removed from the rolling machine and the free ends thereof welded together, as shown in Figure 5, to form the completed hub shell. The hub shell is then introduced to suitable apparatus for countersinking and punching the lugs 14. In connection with this latter step, it should be understood that the lugs may be punched and countersunk at any time during the process of manufacture and accordingly reservation is made to make such re-arrangements in the steps of manufacture as may come within the purview of the accompanying claim.

Thus, from the foregoing it will be observed that I have provided an improved hub shell of one piece construction having concealed lugs for attaching the wheel to a vehicle, and further that I have provided a simple and economical method for fashioning such a hub shell.

What I claim as my invention is:

Those steps in the method of forming vehicle wheel hub shells of the type having concealed attaching means which consist in providing a strip of metal having a laterally projecting flange intermediate the longitudinal edges thereof, fashioning the flange to form attaching portions, hooping the strip to form an annulus with the attaching portions aforesaid extending inwardly therefrom and fashioning the portions on opposite sides of the flange during the hooping operation to a predetermined shape conforming to the desired contour of a hub shell.

CHARLES W. SINCLAIR.